(12) United States Patent
Glasgow, Jr. et al.

(10) Patent No.: US 12,535,001 B2
(45) Date of Patent: Jan. 27, 2026

(54) DOWNHOLE ACOUSTIC SYSTEM FOR DETERMINING A RATE OF PENETRATION OF A DRILL STRING AND RELATED METHODS

(71) Applicant: Baker Hughes Holdings LLC, Houston, TX (US)

(72) Inventors: R. Keith Glasgow, Jr., Willis, TX (US); Eric C. Sullivan, Houston, TX (US); Navish Makkar, Celle (DE); Otto Fanini, Houston, TX (US); Priscila Farias Ronqui, The Woodlands, TX (US); Jason R. Habernal, Magnolia, TX (US); Richard Yao, The Woodlands, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 1706 days.

(21) Appl. No.: 15/720,717

(22) Filed: Sep. 29, 2017

(65) Prior Publication Data

US 2019/0100992 A1    Apr. 4, 2019

(51) Int. Cl.
*G01V 1/00* (2006.01)
*E21B 45/00* (2006.01)
(Continued)

(52) U.S. Cl.
CPC .............. *E21B 47/14* (2013.01); *E21B 45/00* (2013.01); *E21B 47/01* (2013.01); *G01V 2001/526* (2013.01)

(58) Field of Classification Search
None
See application file for complete search history.

(56) References Cited

U.S. PATENT DOCUMENTS

| 4,162,473 A | * | 7/1979 | Utasi | E21B 21/08 |
| | | | | 175/40 |
| 4,452,077 A | * | 6/1984 | Siegfried, II | G01F 1/66 |
| | | | | 73/152.32 |

(Continued)

FOREIGN PATENT DOCUMENTS

| AU | 2010235062 A1 | * | 11/2011 | ............. E21B 47/10 |
| CA | 2395771 C | * | 1/2007 | ............. E21B 44/00 |

(Continued)

OTHER PUBLICATIONS

Gotvald et al., Acoustic Doppler Current Profiler Applications Used in Rivers and Estuaries by the U.S. Geological Survey, USGS Science for Changing World, Fact Sheet 2008-3096, (Feb. 2009), 4 pages.

(Continued)

*Primary Examiner* — Isam A Alsomiri
*Assistant Examiner* — Jonathan D Armstrong
(74) *Attorney, Agent, or Firm* — TraskBritt

(57) ABSTRACT

A method of determining a rate of penetration of a drill bit using acoustic technology. The method comprises providing a drill string including a drill bit configured to drill through a subterranean formation in a wellbore and operably coupling an array of acoustic transducers to a member of the drill string. Acoustic waves are emitted toward a wall of the wellbore with at least one acoustic transducer and a frequency of the acoustic waves reflected from the wall of the wellbore are measured with at least one acoustic transducer. The array of acoustic transducers is operably coupled to a controller comprising a memory and a processor to determine a frequency shift between the emitted acoustic waves and the reflected acoustic waves. A rate of penetration of the drill bit is determined with the processor based at least in part on the frequency shift. Downhole acoustic systems for (Continued)

determining a rate of penetration of a drill string are also disclosed.

20 Claims, 4 Drawing Sheets

(51) Int. Cl.
*E21B 47/01* (2012.01)
*E21B 47/14* (2006.01)
*G01V 1/52* (2006.01)

(56) References Cited

U.S. PATENT DOCUMENTS

| | | | | |
|---|---|---|---|---|
| 4,833,787 | A * | 5/1989 | Van Steenwyk | E21B 47/022 33/302 |
| 4,843,875 | A * | 7/1989 | Kerbart | E21B 44/00 73/152.45 |
| 5,122,990 | A | 6/1992 | Deines et al. | |
| 5,130,950 | A * | 7/1992 | Orban | G01N 29/032 367/34 |
| 5,214,251 | A * | 5/1993 | Orban | E21B 21/08 181/102 |
| 5,250,806 | A * | 10/1993 | Rhein-Knudsen | G01V 5/08 250/254 |
| 5,275,040 | A * | 1/1994 | Codazzi | E21B 21/08 166/254.1 |
| 5,467,320 | A | 11/1995 | Maki, Jr. | |
| 5,726,951 | A * | 3/1998 | Birchak | G01V 1/44 181/102 |
| 6,068,597 | A * | 5/2000 | Lin | A61B 8/0833 600/443 |
| 6,155,357 | A * | 12/2000 | King | E21B 44/00 175/27 |
| 6,192,998 | B1 * | 2/2001 | Pinckard | E21B 3/02 175/27 |
| 6,268,726 | B1 * | 7/2001 | Prammer | G01V 3/32 324/303 |
| 6,470,749 | B1 * | 10/2002 | Han | G01B 17/02 73/609 |
| 6,480,118 | B1 | 11/2002 | Rao | |
| 6,742,604 | B2 * | 6/2004 | Brazil | E21B 7/04 166/255.2 |
| 6,769,497 | B2 | 8/2004 | Dubinsky et al. | |
| 6,791,469 | B1 | 9/2004 | Rao et al. | |
| 7,636,052 | B2 | 12/2009 | Coates et al. | |
| 7,705,295 | B2 | 4/2010 | Jeffryes | |
| 7,950,451 | B2 | 5/2011 | Alberty | |
| 8,125,849 | B2 | 2/2012 | Cabrera et al. | |
| 8,215,384 | B2 | 7/2012 | Trinh et al. | |
| 8,376,065 | B2 | 2/2013 | Teodorescu et al. | |
| 8,411,530 | B2 | 4/2013 | Slocum et al. | |
| 8,881,833 | B2 * | 11/2014 | Radford | E21B 10/322 166/382 |
| 9,074,467 | B2 | 7/2015 | Yang et al. | |
| 2002/0195276 | A1 | 12/2002 | Dubinsky et al. | |
| 2005/0034530 | A1 * | 2/2005 | Han | E21B 47/01 73/784 |
| 2005/0189947 | A1 * | 9/2005 | Haugland | G01V 3/30 324/338 |
| 2006/0175057 | A1 * | 8/2006 | Mandal | G01V 3/265 166/254.2 |
| 2008/0013403 | A1 * | 1/2008 | Camwell | E21B 47/16 367/82 |
| 2008/0186805 | A1 * | 8/2008 | Han | E21B 47/01 367/35 |
| 2008/0316049 | A1 * | 12/2008 | Verret | E21B 47/11 340/854.6 |
| 2009/0207041 | A1 | 8/2009 | Zaeper et al. | |
| 2009/0211754 | A1 * | 8/2009 | Verret | E21B 47/11 166/250.12 |
| 2010/0095757 | A1 | 4/2010 | Hansen | |
| 2010/0118657 | A1 | 5/2010 | Trinh et al. | |
| 2010/0305864 | A1 * | 12/2010 | Gies | E21B 47/095 702/9 |
| 2013/0081880 | A1 | 4/2013 | Schwefe et al. | |
| 2015/0152723 | A1 | 6/2015 | Hay | |
| 2015/0315904 | A1 * | 11/2015 | Manclossi | E21B 47/085 702/8 |
| 2018/0239051 | A1 * | 8/2018 | Appel | G01V 5/06 |

FOREIGN PATENT DOCUMENTS

| | | |
|---|---|---|
| EP | 0621397 B1 | 3/1998 |
| EP | 0865612 B1 | 6/2002 |
| EP | 1714004 B1 | 12/2009 |
| EP | 2417331 B1 | 5/2014 |
| GB | 2331366 A | 5/1999 |
| GB | 2448256 B | 11/2008 |
| WO | 02103158 A1 | 12/2002 |
| WO | 2009105561 A2 | 8/2009 |
| WO | 2010011402 A2 | 1/2010 |
| WO | 2010054353 A2 | 5/2010 |
| WO | 2014007824 A1 | 1/2014 |

OTHER PUBLICATIONS

Kim et al., Using the Acoustic Dopper Current Profiler (ADCP) to Estimate Suspended Sediment Concentration, Technical Report CPSD #04-01, (Dec. 2004), 22 pages.

Kim et al., Estimation of Suspended Sediment Concentration in Estuarine Environments Using Acoustic Backscatter From an ADCP, Department of Geological Sciences, (Oct. 21, 2014), 10 pages.

Massa et al., An Overview of Electroacoustic Transducers, Massa Products Corporation, (2014), 19 pages.

Morlock, Scott E., Evaluation of Acoustic Doppler Current Profiler Measurements of River Discharge, U.S. Geological Survey, Water-Resources Investigations Report 95-4218, (1996), 41 pages.

Perkins et al., Acoustic Doppler Current Profiler Surveys of Velocity Downstream of Albeni Falls Dam, US Army Corps of Engineers, (Sep. 2010), 31 pages.

Rantz et al., Measurement and Computation of Streamflow: vol. 1. Measurement of Stage and Discharge, Geological Survey Water-Supply Paper 2175, USGS Science for Changing the World, (1982), pp. 211-226.

Simpson, Michael R., Discharge Measurements Using a Broad-Band Acoustic Dopper Current Profiler, United States Geological Survey OPen-File Report 01-1, (2001), 134 pages.

SONTEK, Acoustic Doppler Profiler (ADP) Principles of Operation, www.sontek.com, (Nov. 12, 2000), pp. 1-28.

Srinivasan et al., Effects of Acoustic Source and Filtering on Time-of-Flight Measurements, Applied Acoustics, vol. 70, (2009), pp. 1061-1072.

Teledyne RD Instruments, Water Resources Product Overview Guide, How and Where is an ADCP Used?, www.rdinstruments.com, (2008), 2 pages.

Tetley, Laurie, Electronic Navigation Systems (Third Edition), Chapter 3, Speed Measurement, (2012), pp. 45-87.

* cited by examiner

DOWNHOLE ACOUSTIC SYSTEM FOR DETERMINING A RATE OF PENETRATION OF A DRILL STRING AND RELATED METHODS

TECHNICAL FIELD

Embodiments of the disclosure relate generally to drilling systems including acoustic transducers for determining velocity of a drill string component within a wellbore, and to related methods. More particularly, embodiments of the disclosure relate to drilling systems including one or more acoustic transducers and a signal processing unit for determining a rate of penetration of a drill string during a subterranean drilling operation.

BACKGROUND

Wellbores are formed in subterranean formations for various purposes including, for example, extraction of oil and gas and extraction of geothermal heat from the subterranean formation. Wellbores may be formed in a subterranean formation using a drill bit such as, for example, an earth-boring rotary drill bit. Different types of earth-boring rotary drill bits are known in the art including, for example, fixed-cutter bits (which are often referred to in the art as "drag bits"), rolling-cutter bits (which are often referred to in the art as "rock" bits), diamond-impregnated bits, and hybrid bits (which may include, for example, both fixed cutters and rolling cutters). The drill bit is rotated and advanced into the subterranean formation. As the drill bit rotates, the cutters or abrasive structures thereof crush, shear, and/or abrade away the formation material to form the wellbore. A diameter of the wellbore drilled by the drill bit may be defined by the cutting structures disposed at the largest outer diameter, characterized in the art as the "gage diameter," of the drill bit.

The drill bit is coupled, either directly or indirectly, to an end of what is referred to in the art as a "drill string," which comprises a series of elongated tubular segments of drill pipe connected end-to-end that extends into the wellbore from the surface above the formation and commonly terminates at heavier-weight tubular drill collar segments. Often various tools and components, including the drill bit, may be coupled together at the distal end of the drill string at the bottom of the wellbore being drilled. This assembly of tools and components is referred to in the art as a "bottomhole assembly" (BHA).

The drill bit may be rotated within the wellbore by rotating the drill string from the surface, or the drill bit may be rotated by coupling the drill bit to a downhole motor, which is coupled to the drill string between the drill string and the drill bit proximate the bottom of the wellbore. The downhole motor may comprise, for example, a hydraulic Moineau-type motor having a shaft, to which the drill bit is mounted, that may be caused to rotate by pumping fluid (e.g., drilling mud or fluid) from the surface of the formation down through the center of the drill string, through the hydraulic motor, out from nozzles in the drill bit, and back up to the surface of the formation through the annular space between the outer surface of the drill string and the exposed surface of the formation within the wellbore.

During drilling of a wellbore, the rate of penetration (ROP) of the drilling operation is a parameter of significant interest. However, accurate measurement of ROP may be difficult to obtain using conventional means due to, among other issues, drill string flexing, elongation, and contraction as the drill bit proceeds through one or more subterranean formations having different rock characteristics. Such difficulty may be further exacerbated during directional and horizontal drilling, where large segments of the drill string may, at any one time, contact the wellbore wall and frictionally stick while the drill string rotates, followed by sudden release or "slip" when drill string torque overcomes frictional forces.

BRIEF SUMMARY

Embodiments disclosed herein include downhole acoustic systems for determining a rate of penetration of a drill string, as well as related methods. For example, in accordance with one embodiment, a method of determining a rate of penetration of a drill bit comprises providing a drill string including a drill bit configured to drill through a subterranean formation in a wellbore, operably coupling an array of acoustic transducers to a member of the drill string, coupling the array of acoustic transducers to a controller comprising a memory and a processor, emitting acoustic waves toward a wall of the wellbore with at least one acoustic transducer of the array of acoustic transducers, measuring a frequency of acoustic waves reflected from the wall of the wellbore with at least one acoustic transducer of the array of acoustic transducers, determining, with the processor, a frequency shift between the emitted acoustic waves and the reflected acoustic waves, and determining a rate of penetration of the drill bit with the processor based at least in part on the frequency shift.

In additional embodiments, a method of determining a rate of penetration of a drill string comprises operably coupling an array of acoustic transducers within a circumference of at least one of a drill bit coupled to a drill string within a wellbore, another component of a bottomhole assembly coupled to the drill string, or the drill string, operably coupling the array of acoustic transducers to a controller comprising a memory that causes a processor to determine a frequency shift between a source frequency and a measured frequency, transmitting acoustic waves exhibiting the source frequency from at least one acoustic transducer of the array of acoustic transducers, measuring a frequency of the transmitted acoustic waves with at least one acoustic transducer of the array of acoustic transducers, and determining a rate of penetration based at least in part on a value of the frequency shift.

In yet additional embodiments, a downhole acoustic system for determining a rate of penetration of a drill string comprises a member of a drill string within a wellbore, the member of the drill string including a drill bit configured to drill through a formation, an array of acoustic transducers operably coupled to a member of the drill string and configured to transmit acoustic waves exhibiting a first frequency to a wellbore wall, at least one acoustic transducer of the array of acoustic transducers configured to measure a frequency of reflected acoustic waves reflected from the wellbore wall, the reflected acoustic waves exhibiting a second frequency, and a controller operably coupled to the array of acoustic transducers, the controller comprising a memory configured to cause a processor to calculate a frequency shift between the first frequency and the second frequency, and determine a rate of penetration of the drill string through the formation based at least in part on the frequency shift.

DETAILED DESCRIPTION

Figure 1:
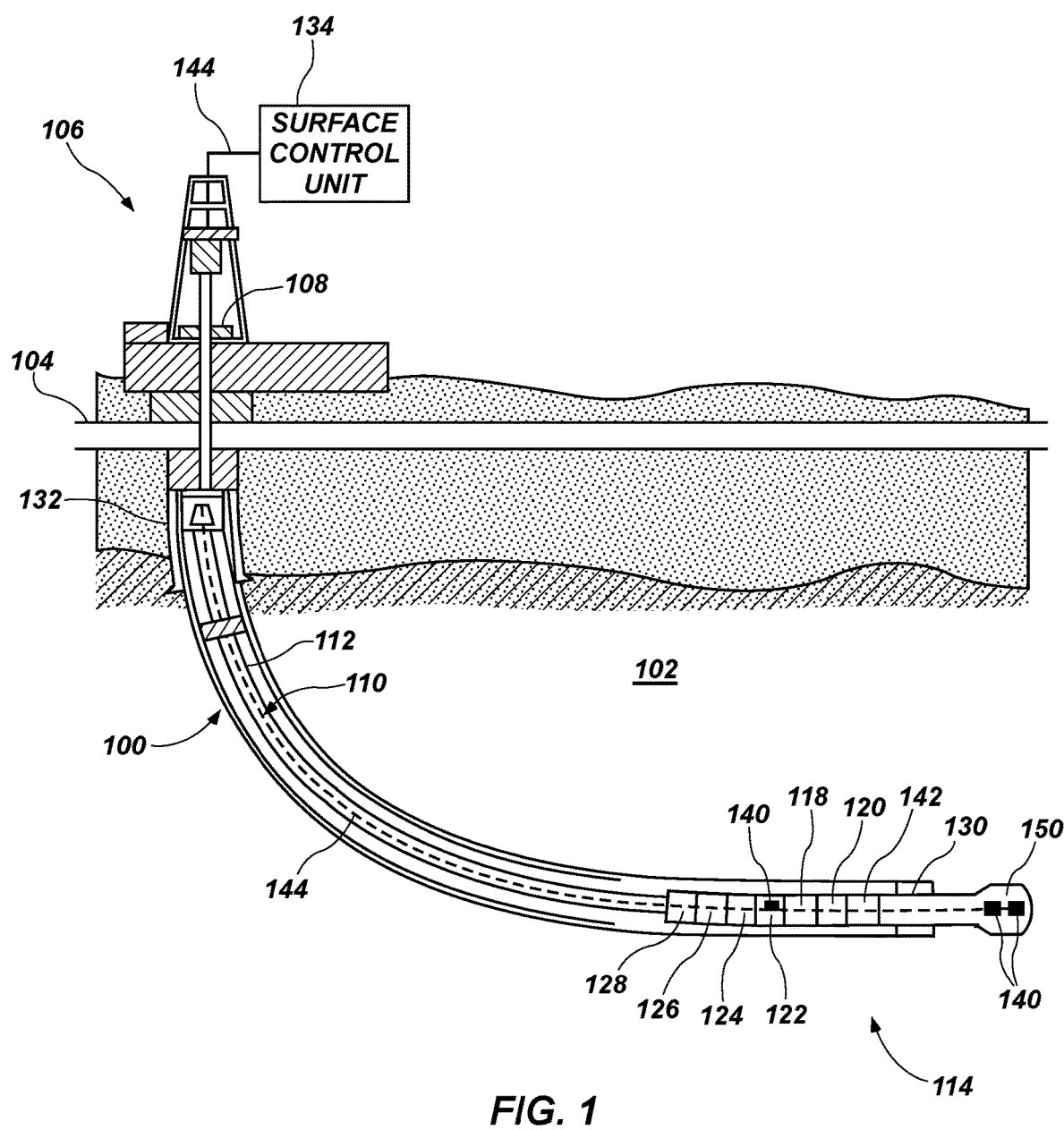
FIG. 1 is a simplified, schematic illustration of a downhole drilling system including a downhole acoustic system for determining a rate of penetration of a drill string, in accordance with an embodiment of the disclosure.

Illustrations presented herein are not meant to be actual views of any particular material, component, or system, but are merely idealized representations that are employed to describe embodiments of the disclosure.

The following description provides specific details, such as material types, compositions, material thicknesses, and processing conditions in order to provide a thorough description of embodiments of the disclosure. However, a person of ordinary skill in the art will understand that the embodiments of the disclosure may be practiced without employing these specific details. Indeed, the embodiments of the disclosure may be practiced in conjunction with conventional techniques employed in the industry. In addition, the description provided below does not form a complete process flow for drilling or operating a wellbore in a subterranean formation. Only those process acts and structures necessary to understand the embodiments of the disclosure are described in detail below.

As used herein, the term "acoustic energy" means and includes acoustic (elastic) waves, such as, for example, acoustic waves that may be emitted from a transducer and reflected back from a target surface or an interface between different material (e.g., fluid) compositions. The acoustic energy may exhibit acoustic properties such as, for example, a frequency, an amplitude, a pulse time, and an energy.

Acoustic energy may be used to determine or estimate a relative speed of one or more acoustic transducers of an array of acoustic transducers relative to, for example, a wall of a wellbore. The relative speed of the acoustic transducers with respect to the wellbore wall may correspond to a rate of penetration of a drill string or a drill bit to which the acoustic transducers are coupled as the drill bit drills the wellbore through subterranean formation material. Thus, acoustic transducers may be coupled to one or more members of the drill string or to the drill bit and may direct acoustic energy toward (e.g., acoustic waves) the wellbore wall. The acoustic transducers may be configured to transmit acoustic energy of at least one of a predetermined frequency, amplitude, energy, and duration. At least some of the acoustic transducers may be configured to generate directional acoustic energy as well as to detect acoustic energy (e.g., acoustic waves) reflected from the wellbore wall. The acoustic transducers may be coupled to one or more controllers including a processor having associated memory and programmed to determine one or more properties of the detected acoustic energy. The one or more properties may include a frequency shift between the acoustic energy transmitted by the acoustic transducers and the reflected acoustic energy received by the acoustic transducers. Responsive to determining the frequency shift, the processor may generate an indication of a relative velocity of the acoustic transducers relative to the wellbore wall, which velocity may substantially correspond to a rate of penetration (ROP) of the drill string to which the acoustic transducers are attached.

FIG. 1 is a simplified, schematic representation showing a nonlimiting example of a wellbore 100 being formed (i.e., drilled or reamed) in a subterranean formation 102. One or more sections of the wellbore 100 may include one or more sections of casing 132 disposed therein. The wellbore 100 may be a partially formed wellbore 100 that is currently undergoing further drilling to extend a depth of the wellbore 100, as well as enlargement of a diameter of the wellbore 100, as illustrated in FIG. 1. Thus, a drilling system 106 used to form the wellbore 100 may include components at a surface 104 of the subterranean formation 102, as well as components that extend into, or are disposed within the wellbore 100. The drilling system 106 includes a rig 108 at the surface 104 of the subterranean formation 102, and a drill string 110 extending into the subterranean formation 102 from the rig 108. The drill string 110 includes a tubular member 112 that carries a bottomhole assembly (BHA) 114 at a distal end thereof. The tubular member 112 may be made up by joining drill pipe sections in an end-to-end configuration.

The bottomhole assembly 114 may include, as nonlimiting examples, one or more of a drill bit 150, a steering device 118, a drilling motor 120, a sensor sub 122, a formation evaluation (FE) module 124, a stabilizer 126, a bidirectional communication and power module (BCPM) 128, and a hole enlargement device 130 (i.e., reamer). The drill bit 150 may be configured to crush, shear, abrade, or otherwise remove portions of the subterranean formation 102 during formation of the wellbore 100. The drill bit 150 may include a fixed-cutter earth-boring rotary drill bit (also referred to as a "drag bit"), a rolling-cutter earth-boring rotary drill bit including cones that are mounted on bearing pins extending from legs of a bit body such that each cone is capable of rotating about the bearing pin on which the cone is mounted, a diamond-impregnated bit, a hybrid bid (which may include, for example, both fixed cutters and rolling cutters), or any other earth-boring tool suitable for forming the wellbore 100.

The drill string 110 and bottomhole assembly 114 may be rotated within the wellbore 100 using the drilling motor 120, from the surface 104 above the bottomhole assembly 114, or both. The drilling motor 120 may comprise, for example, a hydraulic Moineau-type motor having a shaft, to which other components of the bottomhole assembly 114 are coupled, that may be caused to rotate the drill bit 150 by pumping fluid (e.g., drilling mud or fluid) from the surface 104 of the formation 102 down through the center of the drill string 110, through the drilling motor 120, out through nozzles in the drill bit 150, and back up to the surface 104 of the formation 102 through an annular space between an outer surface of the drill string 110 and an exposed surface of the subterranean formation 102 within the wellbore 100 (or an exposed inner surface of any casing 132 within the wellbore 100). The bottomhole assembly 114 may be rotated within the wellbore 100 by rotating the drill string 110 from the surface 104 of the subterranean formation 102 with a rotary table or top drive.

One or more components secured to the drill string 110 may include one or more acoustic transducers 140 for use during formation of the wellbore 100, after the formation of the wellbore 100, or both. In some embodiments, the acoustic transducers 140 may be coupled to or disposed within the drill bit 150, the hole enlargement device 130, or one or more other sections of the bottomhole assembly 114, such as on a drill collar, the stabilizer 126, a reamer (e.g., the hole enlargement device 130), a bit sub, the steering device 118, or other tool or component of the bottomhole assembly 114.

In some embodiments, the drill bit 150 or one or more other drill string components may include, individually or in combination, acoustic transducers 140 operably coupled into an array of acoustic transducers 140. The acoustic transducers 140 may be axially spaced a predetermined distance from one another along a longitudinal axis of the drill string 110, on one or more components or of the bottomhole assembly 114, or on the drill bit 150. By way of nonlimiting example, acoustic transducers 140 may be separated from each other a longitudinal distance between about one inch and about one foot, between about one foot and about two feet, between about two feet and about five feet, between about five feet and about ten feet, between about ten feet and about thirty feet, or between about thirty feet and about fifty feet. In some embodiments, one or more acoustic transducers 140 are attached to different components of the bottomhole assembly 114. In other embodiments, an array of acoustic transducers 140 is coupled to the drill bit 150 and another array of acoustic transducers 140 is coupled to one or more other components of the drill string 110 or of the bottomhole assembly 114. Extended longitudinal spacing of acoustic transducers 140 may enable generation and detection of more substantial frequency shifts between emitted acoustic waves and reflected, received acoustic waves, particularly when the acoustic waves travel through high solids-laden drilling fluids.

The acoustic transducers 140 may include any transducer that generates an electrical signal in response to an applied acoustical energy, generates an acoustic signal in response to an applied electrical signal, or both. The acoustic transducers 140 may include, for example, acoustic wave emitters, receivers, or combined emitter/receivers that utilize piezoelectric effects, electromagnetic effects, magnetostrictive effects, or electrostrictive effects, mass loaded vibratile effects (i.e., Tonpilz sonar transducers), or other suitable sensors for transmitting and/or detecting acoustic energy. In some embodiments, the acoustic transducers 140 comprise a hydrophone coupled to fiber optics including fiber bragg gratings.

At least some of the acoustic transducers 140 may be configured to transmit acoustic energy of a predetermined pulse rate, frequency, amplitude, energy, and combinations thereof and at least some of the acoustic transducers 140 may be configured to detect acoustic energy, such as acoustic energy transmitted from at least some of the other acoustic transducers 140. The receiving acoustic transducers 140 may be configured to convert emitted acoustic waves reflected from a target surface or interface between different materials detected by the acoustic transducers 140 to an electronic signal, such as, for example, a voltage, which may then be compared by the processor to the voltage employed to emit the acoustic waves. As described herein, the electronic signal may be characterized upon receipt as a waveform, which may be used to determine frequency shift between acoustic waves transmitted by one or more acoustic transducers 140 and acoustic waves received by one or more acoustic transducers 140. In some embodiments, each of the acoustic transducers 140 may be configured to both transmit acoustic energy and receive acoustic energy. The transmitted acoustic energy may exhibit predetermined acoustic properties, such as, for example, a frequency, an amplitude, a pulse time, a time between pulses, and an energy. In some embodiments, at least some of the acoustic transducers 140 may transmit acoustic energy exhibiting one or more different acoustic properties than acoustic energy transmitted from at least other acoustic transducers 140.

The acoustic transducers 140 may be in electrical communication with one or more controllers, such as one or more of a surface controller 134 or a downhole controller 142. The surface controller 134 may be used for receiving and processing downhole data. The surface controller 134 may include a processor, a storage device (e.g., a memory) for storing data, and computer programs. The processor accesses the data and programs from the storage device and executes the instructions contained in the programs to control the drilling system 106 during drilling operations. In some embodiments, the surface controller 134 may be operably coupled to an electronic display for displaying one or more conditions within the wellbore 100.

A downhole controller 142 may be in electrical communication with the acoustic transducers 140. The downhole controller 142 may be placed within the wellbore 100 for receiving and processing downhole data in the form of emitted and received acoustic waves. The downhole controller 142 may include a processor (e.g., a microprocessor), a storage device (e.g., a memory) for storing data, and computer programs. The processor accesses the data and programs from the storage device and executes the instructions contained in the programs to control operation of the acoustic transducers 140 during drilling operations and to convert a voltage corresponding to a frequency of detected acoustic waves to a waveform for comparison to emitted acoustic waves to determine Doppler shift, and thus velocity of the component or components carrying acoustic transducers 140 and, ultimately ROP.

The downhole controller 142 may be configured to transmit electronic signals to at least some of the acoustic transducers 140 to initiate emission of acoustic waves and to receive electronic signals from at least some of the acoustic transducers 140 corresponding to received acoustic waves. In some embodiments, the downhole controller 142 is configured to transmit the electronic signals to, and receive the electronic signals from, each of the acoustic transducers 140.

The downhole controller 142 may be configured to condition, filter, amplify, or otherwise process the signals from the acoustic transducers 140, as described herein.

The downhole controller 142 may be configured to communicate data with the surface controller 134 and, thus, may be in electrical communication with the surface controller 134. In some embodiments, the acoustic transducers 140, the downhole controller 142, and the surface controller 134 communicate with each other via a communication interface 144. The communications interface 144 may include a wire configured to transmit the data to and from the surface 104, wireless communications, electrical cables, fiber optic cables, mud pulse telemetry, or other interface suitable for transferring data and signals to and from each of the acoustic transducers 140, the downhole controller 142, and the surface controller 134. If carried by drill bit 150, the acoustic transducers 140 may be in communication with downhole controller 142 by, for example, a so-called "short hop" wireless interface.

The communication interface 144 may extend along an interior of the drill string 110 (such as an interior of the tubular member 112), similar to a wireline, as is known to those of ordinary skill in the art, and may run into the drill string 110 as desired, or may be permanently deployed within the drill string 110, such as within the walls of the components of the drill string 110 and bottomhole assembly 114. Although the communication interface 144 is illustrated as extending along an interior of the drill string 110, the communication interface 144 may be located at any suitable location within the wellbore 100 relative to the drill string 110. For example, the communication interface 144 may run along an exterior of the drill string 110, or comprise part of a self-contained sensor package configured for wireless communication.

Figure 2:
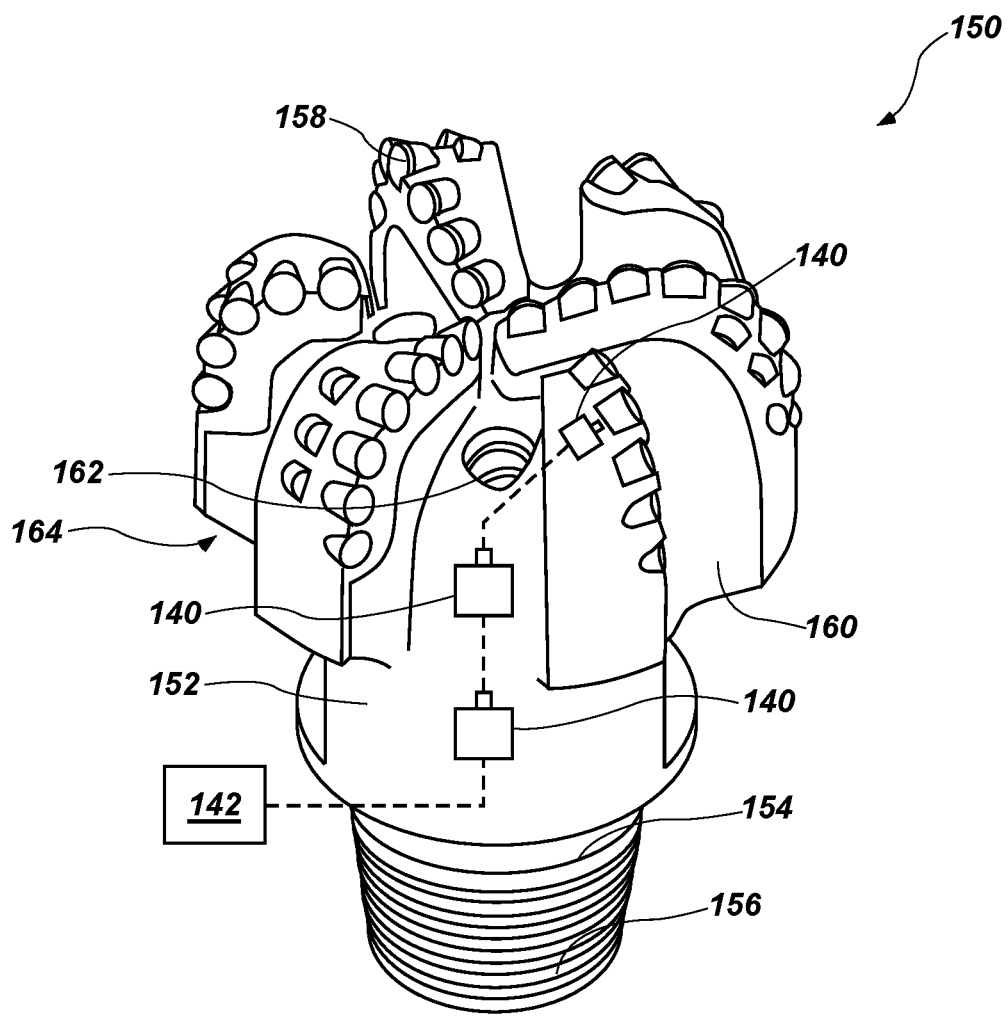
FIG. 2 is a perspective view of an earth-boring tool, in accordance with an embodiment of the disclosure.

Referring to FIG. 2, a drill bit 150, such as a fixed-cutter earth-boring rotary drill bit, is illustrated. The drill bit 150 may include a bit body 152 with a shank 154 having a connection portion 156, such as a threaded connection, configured to attach the drill bit 150 to a drill string 110 (FIG. 1).

The drill bit 150 may include cutting elements 158 secured thereto. As a nonlimiting example, the cutting elements 158 may include polycrystalline diamond compact (PDC) cutting elements. The drill bit 150 may further include blades 160, each of which may extend radially outward from a cone region of the drill bit 150. One or more nozzles 162 may be secured within the junk slots proximate the exterior surface of the drill bit 150 between blades 160 for controlling the hydraulics of the drill bit 150 during drilling. Drilling fluid (e.g., drilling mud) may be pumped down the drill string 110 (FIG. 1), through an internal plenum and fluid passageways 168 (illustrated in FIG. 3) within the bit body 152, and out of the drill bit 150 through the nozzles 162. Formation cuttings generated by the cutting elements 158 may be carried with the drilling fluid through fluid courses 164, around the drill bit 150, and back up the wellbore 100 through the annular space between the drill string 110 and the wellbore 100.

The drill bit 150 may include one or more acoustic transducers 140 attached thereto or embedded therein. In some embodiments, one or more acoustic transducers 140 are coupled to the drill bit 150 within the shank 154, while in other embodiments, one or more acoustic transducers are disposed on the bit face within the junk slots or in blades 160, for example, proximate rotationally trailing surfaces of one or more blades. It will be understood by those of ordinary skill in the art that acoustic transducers 140 should be placed at locations providing a standoff distance from the wall of the wellbore and at an acute angle to a longitudinal axis of the drill bit 150 to provide adequate time of flight of acoustic waves to provide a frequency shift between emission and receipt of acoustic waves. As described above, the acoustic transducers 140 may be in communication with, for example, the downhole controller 142 via the communication interface 144.

In some embodiments, and as noted above, the acoustic transducers 140 are oriented to direct acoustic energy at an acute angle to a longitudinal axis of the drill string 110 or the drill bit 150 in a direction toward the progress of the drill bit 150 in drilling the formation. In other words, the acoustic transducers 140 may be configured to transmit acoustic energy in a forward direction that is oblique to the wellbore 100 wall. The acoustic energy transmitted to the wellbore 100 wall may be reflected from a surface of the wellbore 100 wall and may propagate back toward the drill string 110, the drill bit 150, and the acoustic transducers 140 coupled thereto.

Figure 3:
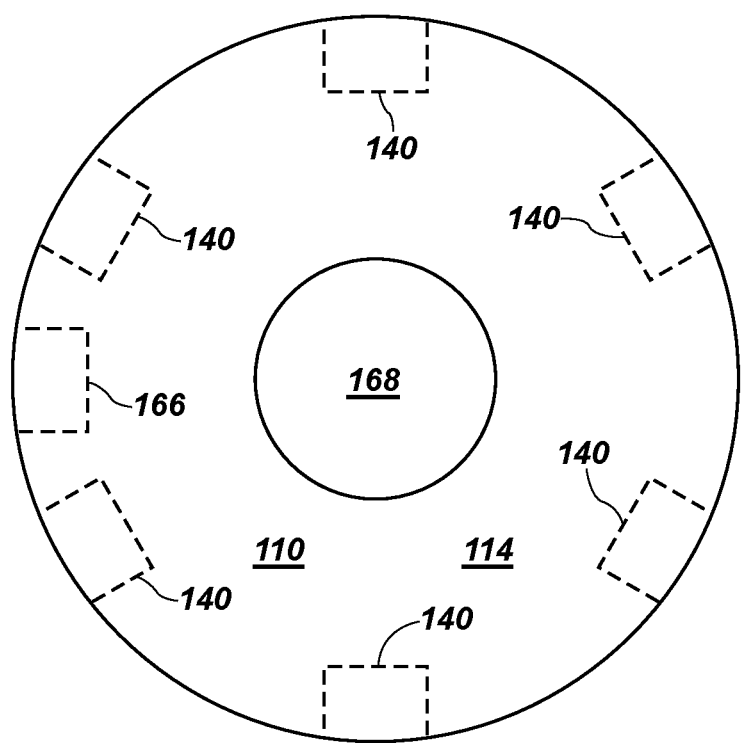
FIG. 3 is a schematic view of a drill string taken perpendicular to a longitudinal axis thereof including acoustic transducers circumferentially disposed around the drill string, in accordance with an embodiment of the disclosure.

FIG. 3 is a schematic view of the drill string 110 taken perpendicular to the longitudinal axis thereof. The acoustic transducers 140 may be operably coupled to (e.g., associated with) at least one member of the drill string 110, such as at least one component of the bottomhole assembly 114 or the drill bit 150 (FIG. 2). The acoustic transducers 140 may be coupled to the drill string 110 within and along a circumference thereof. At least some of the acoustic transducers 140 may be coupled to the drill string 110 at a same axial location along the longitudinal axis of the drill string 110. Stated another way, at least some of the acoustic transducers 140 may not be separated from each other along the longitudinal axis of the drill string 110, but rather, may be separated from each other along a circumference of the drill string 110.

In some embodiments, at least some (e.g., three) acoustic transducers 140 configured to generate and transmit acoustic waves are coupled to the drill string 110 around a circumference thereof, such as at about 120° from each other. In some such embodiments, at least some (e.g., three) acoustic transducers 140 configured to detect acoustic waves reflected from the wellbore 100 wall are coupled to the drill string 110 between at least some of the acoustic transducers 140 configured to transmit the acoustic waves. In use and operation, at least some of the acoustic transducers 140 may transmit acoustic waves toward the wellbore 100 wall. The drill string 110 may rotate as the transmitted acoustic waves travel to, and reflect from, the wellbore 100 wall toward the drill string 110. Accordingly, the acoustic transducers 140 configured to detect the acoustic waves may be located around the circumference of the drill string 110 and may detect the reflected acoustic waves, even though the drill string 110 has rotated during transmission and reflection of the acoustic waves. Although FIG. 3 illustrates six acoustic transducers 140 located about 60° from each other around a circumference of the drill string 110, any number of acoustic transducers 140 may be coupled to the drill string 110 around a circumference thereof. Further, the acoustic transducers 140 may be disposed at angles other than 60° relative to each other around the drill string 110, such as, for example, about 30°, 45°, or any other suitable angle.

Figure 4:
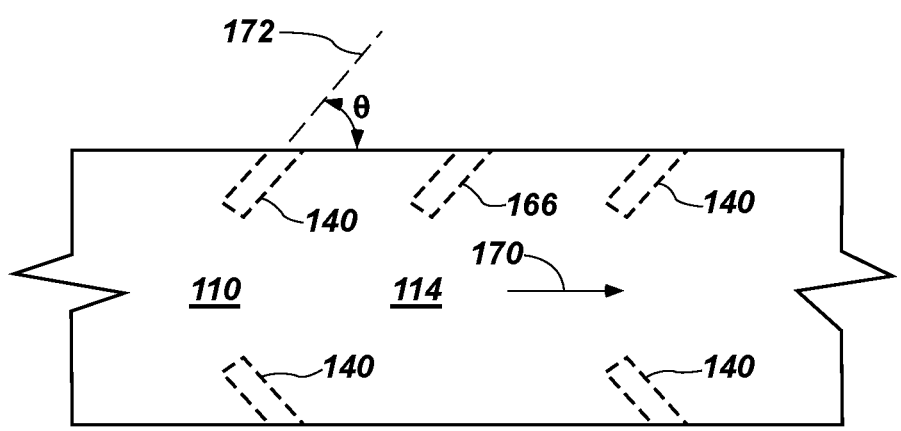
FIG. 4 is a schematic view of a portion of a drill string taken along a longitudinal axis thereof, in accordance with an embodiment of the disclosure.

FIG. 4 illustrates a cross-sectional view of a portion of the drill string 110 or bottomhole assembly 114 taken along the longitudinal axis of the drill string 110. As previously described, the acoustic transducers 140 may be oriented to direct acoustic energy (illustrated at line 172) at an acute angle ($\theta$) relative to a longitudinal axis of the drill string 110 and in a forward direction (illustrated at arrow 170) of the drill string 110. Angle $\theta$ may be between about 10° and about 80°, such as between about 10° and about 30°, between about 30° and about 45°, between about 45° and about 60°, or between about 60° and about 80°. Although FIG. 4 illustrates a first array of acoustic transducers 140 circumferentially arranged around the drill string 110 or the bottomhole assembly 114 at a first longitudinal location and a second array of acoustic transducers 140 circumferentially arranged around the drill string 110 at a second longitudinal location of the drill string 110, the drill string 110 may include any number of arrays of acoustic transducers 140.

Acoustic energy reflected from the wellbore 100 may be detected by the acoustic transducers 140. As described above, at least some of the acoustic transducers 140 may be configured to detect acoustic signals and convert the detected acoustic signals to an electronic signal, such as a voltage. The voltage may correlate to one or more frequencies of the detected acoustic energy. The voltage may be recorded over time to form a waveform, representative of acoustic activity within the wellbore 100.

Figure 5:
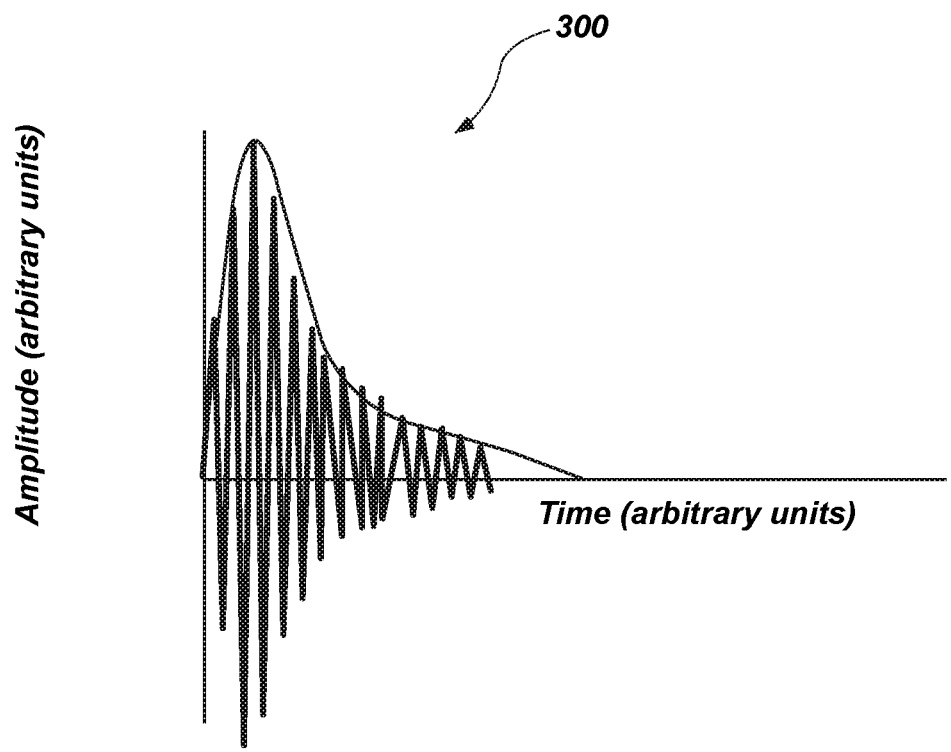
FIG. 5 is a graph of an acoustic waveform within a subterranean formation.

Referring to FIG. 5, an acoustic waveform 300 illustrating a voltage output by the one or more acoustic transducers 140 as a function of time is shown. One of the downhole controller 142 and the acoustic transducers 140 may include a clock for determining a time that the acoustic waves are detected. The processor of the downhole controller 142 may generate the waveform 300 from the received voltage output, and will have, resident in memory associated with the processor, the waveform of the voltage used to initiate emission of acoustic waves. The processor may determine a frequency of the waveform 300 by measuring a number of cycles per unit time.

The processor may be configured to determine or estimate a rate of penetration of the drill string 110 during drilling operations using the frequency obtained from the waveform 300, according to the following equation:

$$F_{shift} = -F_s(V/C)\cos(\theta) \qquad (1),$$

where $F_s$ is the frequency emitted by the one or more acoustic transducers 140, V is the velocity of the drill string 110 (or the acoustic transducers 140) relative to the wellbore 100, C is the speed of the acoustic wave (e.g., speed of sound) in the medium through which the acoustic waves travel (e.g., the drilling fluid between the acoustic transducers 140 and the wall of wellbore 100), $F_{shift}$ is a frequency shift between the frequency of acoustic waves detected by the acoustic transducers 140 (i.e., the frequency of the waveform 300) and $F_s$, and $\theta$ (illustrated in FIG. 4) is an angle between the longitudinal axis of the drill string 110 and the direction of emission of the acoustic waves. $F_{shift}$ may be referred to as a Doppler shift.

The speed of sound in the wellbore 100 (i.e., the value of C in equation (1) above) through various drilling fluids may be determined in a laboratory and stored in the memory of the downhole controller 142. By way of nonlimiting example, C may be equal to between about 1400 m/s and about 2000 m/s, depending on the temperature, a concentration of solids in the drilling fluid, salinity, and other conditions of the drilling fluid between the drill string 110 and the wellbore 100. Accordingly, in some embodiments, the processor may be programmed to compensate for attenuation of the acoustic signals and temperature effects of the drilling fluid within the wellbore 100. By way of nonlimiting example, the memory may include, in the form of a look-up table, different values of the velocity of the acoustic waves in the drilling fluid at different temperatures. Accordingly, the drilling system 106 may include a temperature sensor configured to measure a temperature proximate the acoustic transducers 140. The processor may also compensate for attenuation of the acoustic waves caused by salinity or solids dispersed within the drilling fluid.

$F_s$ may be controlled by the processor and may be selected such that it is outside a range of acoustic energy generated within the wellbore 100 during normal drilling operations such that a frequency of the acoustic waves detected by the acoustic transducers 140 is outside a frequency range of normal acoustic emissions generated during normal drilling operations. In some embodiments, $F_s$ is selected to be greater than about 1 kHz.

$F_{shift}$ may be determined by the processor by subtracting the frequency detected by the acoustic transducers 140 from $F_s$. For example, the signal processing circuitry may be configured to determine $F_{shift}$ based on $F_s$ and the frequency of the waveform 300. $F_{shift}$ may be used by the signal processing circuitry to determine the speed of the drill string 110 or the drill bit 150 to which the acoustic transducers 140 are attached relative to the wellbore 100, which speed may be substantially equal to the rate of penetration of the drill string 110.

The processor may also be configured to compensate for effects of the velocity of the drilling fluid in an annular space between the drill string 110 and the wellbore 100 wall on the acoustic waves. By way of nonlimiting example, the downhole controller 142 may be configured to receive an indication of a velocity of the drilling fluid relative to, for example, the wellbore 100 wall, such velocity calculated from volume flow rates, wellbore 100, drill string 110, and bottomhole assemblies 114 diameters, or may be measured at the bottomhole assembly 114 using a flowmeter having an output operably coupled to downhole controller 142. An ultrasonic Doppler flowmeter 166 (shown in FIG. 3 and FIG. 4) operating at a different frequency than the acoustic transducers 140 may be particularly suitable for this purpose, and may be mounted to a component of the bottomhole assembly 114 or drill string 110. Accordingly, the ROP determined by the processor may account for any changes in the velocity of the drilling fluid in the annular space.

In other embodiments, the processor may be further configured to compensate for attenuation of the acoustic waves as a result of rotation of the drill string 110 between signal transmission and signal detection. By way of example, the processor may receive an indication of a rotation rate (e.g., RPM) of the drill string 110 and a time between signal transmission and signal detection to determine an amount of rotation of the drill string 110.

In some embodiments, a time of flight for an acoustic wave to travel from an acoustic transducer 140, to the wellbore 100, and back to an acoustic transducer 140 may be used to determine a geometry of the wellbore 100. For example, a distance and, therefore, a time, for an acoustic wave to travel from acoustic transducers 140, to the wellbore 100, and back to the acoustic transducers 140 may depend on a geometry of the wellbore 100. Accordingly, the signal processing circuitry may be configured to image surfaces of the wellbore 100 using an array of acoustic transducers 140 placed circumferentially around an exterior surface of drill bit 150 or of a drill string or component of the bottomhole assembly 114.

Although the processor for determining the rate of penetration has been described herein with respect to the downhole controller 142, it is contemplated that the surface controller 134 includes memory, and a processor for determining the rate of penetration from raw data transmitted uphole from the acoustic transducers 140. In some such embodiments, the drilling system 106 may not include the downhole controller 142 and may include, for example, only the surface controller 134 and a suitable communications interface 144.

Additional nonlimiting example embodiments of the disclosure are set forth below.

Embodiment 1: A method of determining a rate of penetration of a drill bit, the method comprising: providing a drill string including a drill bit configured to drill through a subterranean formation in a wellbore; operably coupling an array of acoustic transducers to a member of the drill string; coupling the array of acoustic transducers to a controller comprising a memory and a processor; emitting acoustic waves toward a wall of the wellbore with at least one acoustic transducer of the array of acoustic transducers; measuring a frequency of acoustic waves reflected from the wall of the wellbore with at least one acoustic transducer of the array of acoustic transducers; determining, with the processor, a frequency shift between the emitted acoustic waves and the reflected acoustic waves; and determining a rate of penetration of the drill bit with the processor based at least in part on the frequency shift.

Embodiment 2: The method of Embodiment 1, wherein emitting acoustic waves toward a wall of the wellbore with at least one acoustic transducer and measuring a frequency of acoustic waves reflected from the wall of the wellbore with at least one acoustic transducer comprises emitting and measuring acoustic waves with the same acoustic transducer.

Embodiment 3: The method of Embodiment 1, wherein emitting acoustic waves toward a wall of the wellbore with at least one acoustic transducer and measuring a frequency of acoustic waves reflected from the wall of the wellbore with at least one acoustic transducer comprises emitting and measuring acoustic waves with different acoustic transducers.

Embodiment 4: The method of any one of Embodiments 1 through 3, wherein operably coupling an array of acoustic transducers to a member of the drill string comprises operably coupling at least a first acoustic transducer to a member of the drill string and at least a second acoustic transducer to the member of the drill string a known distance along a longitudinal axis of the drill string from the at least a first acoustic transducer.

Embodiment 5: The method of any one of Embodiments 1 through 4, wherein operably coupling an array of acoustic transducers to a member of the drill string comprises operably coupling at least a first acoustic transducer to the drill bit and operably coupling at least a second acoustic transducer to the drill string.

Embodiment 6: The method of any one of Embodiments 1 through 5, wherein emitting acoustic waves toward a wall of the wellbore with at least one acoustic transducer of the array of acoustic transducers comprises emitting acoustic waves at an acute angle to a longitudinal axis of the drill string.

Embodiment 7: The method of any one of Embodiments 1 through 6, wherein emitting acoustic waves toward a wall of the wellbore with at least one acoustic transducer of the array of acoustic transducers comprises emitting acoustic waves at a frequency greater than about 1 kHz toward the wall of the wellbore.

Embodiment 8: A method of determining a rate of penetration of a drill string, the method comprising: operably coupling an array of acoustic transducers within a circumference of at least one of a drill bit coupled to a drill string within a wellbore, another component of a bottomhole assembly coupled to the drill string, or the drill string; operably coupling the array of acoustic transducers to a controller comprising a memory that causes a processor to determine a frequency shift between a source frequency and a measured frequency; transmitting acoustic waves exhibiting the source frequency from at least one acoustic transducer of the array of acoustic transducers; measuring a frequency of the transmitted acoustic waves with at least one acoustic transducer of the array of acoustic transducers; and determining a rate of penetration based at least in part on a value of the frequency shift.

Embodiment 9: The method of Embodiment 8, wherein operably coupling an array of acoustic transducers within a circumference of at least one of a drill bit coupled to a drill string within a wellbore, another component of a bottomhole assembly coupled to the drill string, or the drill string comprises operably coupling an array of acoustic transducers to the drill bit.

Embodiment 10: The method of Embodiment 8, wherein operably coupling an array of acoustic transducers around a circumference of at least one of a drill bit coupled to a drill string within a wellbore, another component of a bottomhole assembly coupled to the drill string, or the drill string comprises operably coupling an array of acoustic transducers to the drill string.

Embodiment 11: The method of any one of Embodiments 8 through 10, wherein operably coupling an array of acoustic transducers around a circumference of at least one of a drill bit coupled to a drill string within a wellbore, another component of a bottomhole assembly coupled to the drill string, or the drill string comprises operably coupling at least some acoustic transducers configured to transmit acoustic waves and at least some acoustic transducers configured to detect reflected acoustic waves circumferentially around at least one of the drill string or the drill bit.

Embodiment 12: The method of any one of Embodiments 8 through 11, wherein measuring a frequency of the transmitted acoustic waves with at least one acoustic transducer of the array of acoustic transducers comprises measuring a frequency of acoustic waves transmitted from the wall of the wellbore.

Embodiment 13: The method of any one of Embodiments 8 through 12, further comprising storing in the memory, a value of an acoustic velocity of acoustic waves in drilling fluid and using the value of the acoustic velocity to determine the rate of penetration.

Embodiment 14: The method of any one of Embodiments 8 through 13, wherein operably coupling an array of acoustic transducers around a circumference of at least one of a drill bit coupled to a drill string within a wellbore, another component of a bottomhole assembly coupled to the drill string, or the drill string comprises operably coupling the array of acoustic transducers at an acute angle to a longitudinal axis of the drill string and oriented in a forward direction of the drill string.

Embodiment 15: A downhole acoustic system for determining a rate of penetration of a drill string, the downhole acoustic system comprising: a member of a drill string within a wellbore, the member of the drill string including a drill bit configured to drill through a formation; an array of acoustic transducers operably coupled to a member of the drill string and configured transmit acoustic waves exhibiting a first frequency to a wellbore wall, at least one acoustic transducer of the array of acoustic transducers configured to measure a frequency of reflected acoustic waves reflected from the wellbore wall, the reflected acoustic waves exhibiting a second frequency; and a controller operably coupled to the array of acoustic transducers, the controller comprising a memory configured to cause a processor to: calculate a frequency shift between the first frequency and the second frequency; and determine a rate of penetration of the drill string through the formation based at least in part on the frequency shift.

Embodiment 16: The downhole acoustic system of Embodiment 15, wherein the array of acoustic transducers is operably coupled to the member of the drill string at an acute angle to a longitudinal axis of the drill string.

Embodiment 17: The downhole acoustic system of Embodiment 15 or Embodiment 16, wherein the array of acoustic transducers is oriented to direct acoustic waves in a forward direction of the drill string.

Embodiment 18: The downhole acoustic system of any one of Embodiments 15 through 17, wherein the array of acoustic transducers is coupled to the drill bit.

Embodiment 19: The downhole acoustic system of any one of Embodiments 15 through 18, wherein at least one acoustic emission transducer of the array of acoustic transducers is configured to transmit acoustic waves and measure the frequency of the reflected acoustic waves.

Embodiment 20: The downhole acoustic system of any one of Embodiments 15 through 19, wherein the processor includes data related to an acoustic velocity of the acoustic waves in a drilling fluid.

Although the foregoing description contains many specifics, these are not to be construed as limiting the scope of the disclosure, but merely as providing certain embodiments. Similarly, other embodiments may be devised that do not depart from the scope of the invention. For example, features described herein with reference to one embodiment also may be provided in others of the embodiments described herein. The scope of the invention is, therefore, indicated and limited only by the appended claims and their legal equivalents, rather than by the foregoing description. All additions, deletions, and modifications to embodiments of the disclosure, as described and illustrated herein, which fall within the meaning and scope of the claims, are encompassed by the invention.

What is claimed is:

1. A method of determining a rate of penetration of a drill bit, the method comprising:
    providing a drill string including a drill bit configured to drill through a subterranean formation in a wellbore;
    operably coupling an array of acoustic transducers to a member of the drill string;
    coupling the array of acoustic transducers to a controller comprising a memory and a processor;
    emitting acoustic waves toward a wall of the wellbore in a direction defining an acute angle with a longitudinal axis of the drill string with at least one acoustic transducer of the array of acoustic transducers;
    measuring a frequency of acoustic waves reflected from the wall of the wellbore with at least one acoustic transducer of the array of acoustic transducers;
    receiving, from a flow meter operating at a different frequency than the acoustic transducers, an indication of a velocity of drilling fluid between the array of acoustic transducers and the wall of the wellbore during the time between emitting the acoustic waves and detecting the reflected acoustic waves;
    receiving an indication of a rotation rate of the drill bit during the time between emitting the acoustic waves and detecting the reflected acoustic waves;
    determining, with the processor, a frequency shift between the emitted acoustic waves and the reflected acoustic waves;
    determining an effect of the velocity of the drilling fluid on the frequency shift based at least partially on the received indication of the velocity of the drilling fluid;
    determining an effect of the rotation rate of the drill bit during the time between emitting the acoustic waves and detecting the reflected acoustic waves on the frequency shift;
    based at least partially on the determined frequency shift, the effect of the velocity of the drilling fluid on the frequency shift, the effect of the rotation rate of the drill bit on the frequency shift, and the acute angle, determining a velocity of the acoustic transducers of the array of acoustic transducers relative to the wall of the wellbore; and
    determining a rate of penetration of the drill bit with the processor based at least in part on the determined velocity of the acoustic transducers of the array of acoustic transducers relative to the wall of the wellbore.

2. The method of claim 1, wherein emitting acoustic waves toward a wall of the wellbore with at least one acoustic transducer and measuring a frequency of acoustic waves reflected from the wall of the wellbore with at least one acoustic transducer comprises emitting and measuring acoustic waves with the same acoustic transducer.

3. The method of claim 1, wherein emitting acoustic waves toward a wall of the wellbore with at least one acoustic transducer and measuring a frequency of acoustic waves reflected from the wall of the wellbore with at least one acoustic transducer comprises emitting and measuring acoustic waves with different acoustic transducers.

4. The method of claim 1, wherein operably coupling an array of acoustic transducers to a member of the drill string comprises operably coupling at least a first acoustic transducer to a member of the drill string and at least a second acoustic transducer to the member of the drill string a known distance along a longitudinal axis of the drill string from the at least a first acoustic transducer.

5. The method of claim 1, wherein operably coupling an array of acoustic transducers to a member of the drill string comprises operably coupling at least a first acoustic transducer to the drill bit and operably coupling at least a second acoustic transducer to the drill string.

6. The method of claim 1, wherein emitting acoustic waves toward a wall of the wellbore with at least one acoustic transducer of the array of acoustic transducers comprises emitting acoustic waves at an acute angle to a longitudinal axis of the drill string.

7. The method of claim 1, wherein emitting acoustic waves toward a wall of the wellbore with at least one acoustic transducer of the array of acoustic transducers comprises emitting acoustic waves at a frequency greater than about 1 kHz toward the wall of the wellbore.

8. A method of determining a rate of penetration of a drill string, the method comprising:
    operably coupling an array of acoustic transducers within a circumference of at least one of a drill bit coupled to a drill string within a wellbore, another component of a bottomhole assembly coupled to the drill string, or the drill string;
    operably coupling the array of acoustic transducers to a controller comprising a memory and a processor;
    transmitting acoustic waves exhibiting a source frequency from at least one acoustic transducer of the array of acoustic transducers toward a wall of the wellbore in a direction defining an acute angle with a longitudinal axis of the drill string;
    measuring a frequency of reflected acoustic waves with at least one acoustic transducer of the array of acoustic transducers;
    receiving, from a flow meter operating at a different frequency than the acoustic transducers, an indication of a velocity of drilling fluid between the array of acoustic transducers and the wall of the wellbore during the time between emitting the acoustic waves and measuring the reflected acoustic waves;
    receiving an indication of a rotation rate of the drill bit during the time between emitting the acoustic waves and measuring the reflected acoustic waves;
    determining, with the processor, a frequency shift between the emitted acoustic waves and the measured acoustic waves;
    determining an effect of the velocity of the drilling fluid on the frequency shift based at least partially on the received indication of the velocity of the drilling fluid;
    determining an effect of the rotation rate of the drill bit during the time between emitting the acoustic waves and detecting the reflected acoustic waves on the frequency shift;

based at least partially on the determined frequency shift, the effect of the velocity of the drilling fluid on the frequency shift, the effect of the rotation rate of the drill bit on the frequency shift, and the acute angle, determining a velocity of the acoustic transducers of the array of acoustic transducers relative to the wall of the wellbore; and determining a rate of penetration based at least in part on a value of the determined velocity of the acoustic transducers of the array of acoustic transducers relative to the wall of the wellbore.

9. The method of claim 8, wherein operably coupling an array of acoustic transducers within a circumference of at least one of a drill bit coupled to a drill string within a wellbore, another component of a bottomhole assembly coupled to the drill string, or the drill string comprises operably coupling an array of acoustic transducers to the drill bit.

10. The method of claim 8, wherein operably coupling an array of acoustic transducers around a circumference of at least one of a drill bit coupled to a drill string within a wellbore, another component of a bottomhole assembly coupled to the drill string, or the drill string comprises operably coupling an array of acoustic transducers to the drill string.

11. The method of claim 8, wherein operably coupling an array of acoustic transducers around a circumference of at least one of a drill bit coupled to a drill string within a wellbore, another component of a bottomhole assembly coupled to the drill string, or the drill string comprises operably coupling at least some acoustic transducers configured to transmit acoustic waves and at least some acoustic transducers configured to detect reflected acoustic waves circumferentially around at least one of the drill string or the drill bit.

12. The method of claim 8, wherein measuring a frequency of the transmitted acoustic waves with at least one acoustic transducer of the array of acoustic transducers comprises measuring a frequency of acoustic waves transmitted from the wall of the wellbore.

13. The method of claim 8, further comprising storing in the memory, a value of an acoustic velocity of acoustic waves in drilling fluid and using the value of the acoustic velocity to determine the rate of penetration.

14. The method of claim 8, wherein operably coupling an array of acoustic transducers around a circumference of at least one of a drill bit coupled to a drill string within a wellbore, another component of a bottomhole assembly coupled to the drill string, or the drill string comprises operably coupling the array of acoustic transducers at an acute angle to a longitudinal axis of the drill string and oriented in a forward direction of the drill string.

15. A downhole acoustic system for determining a rate of penetration of a drill string, the downhole acoustic system comprising:

a member of a drill string within a wellbore, the member of the drill string including a drill bit configured to drill through a formation;

an array of acoustic transducers operably coupled to a member of the drill string and configured transmit acoustic waves exhibiting a first frequency to a wellbore wall in a direction defining an acute angle with a longitudinal axis of the drill string, at least one acoustic transducer of the array of acoustic transducers configured to measure a frequency of reflected acoustic waves reflected from the wellbore wall, the reflected acoustic waves exhibiting a second frequency; and a downhole controller operably coupled to the array of acoustic transducers, the downhole controller comprising a memory configured to cause a processor to:

receive, from a flow meter operating at a different frequency than the acoustic transducers, an indication of a velocity of drilling fluid between the array of acoustic transducers and the wellbore wall during the time between transmitting the acoustic waves and measuring the reflected acoustic waves;

receive an indication of a rotation rate of the drill bit during the time between transmitting the acoustic waves and measuring the reflected acoustic waves;

calculate a frequency shift between the first frequency and the second frequency;

determine an effect of the velocity of the drilling fluid on the frequency shift based at least partially on the received indication of the velocity of the drilling fluid;

determine an effect of the rotation rate of the drill bit during the time between transmitting the acoustic waves and measuring the reflected acoustic waves on the frequency shift;

based at least partially on the determined frequency shift, the effect of the velocity of the drilling fluid on the frequency shift, the effect of the rotation rate of the drill bit on the frequency shift, and the acute angle, determine a velocity of the acoustic transducers of the array of acoustic transducers relative to the wellbore wall; and determine a rate of penetration of the drill string through the formation based at least in part on the determined velocity of the acoustic transducers of the array of acoustic transducers relative to the wall of the wellbore.

16. The downhole acoustic system of claim 15, wherein the array of acoustic transducers is operably coupled to the member of the drill string at an acute angle to a longitudinal axis of the drill string.

17. The downhole acoustic system of claim 16, wherein the array of acoustic transducers is oriented to direct acoustic waves in a forward direction of the drill string.

18. The downhole acoustic system of claim 15, wherein the array of acoustic transducers is coupled to the drill bit.

19. The downhole acoustic system of claim 15, wherein at least one acoustic emission transducer of the array of acoustic transducers is configured to transmit acoustic waves and measure the frequency of the reflected acoustic waves.

20. The downhole acoustic system of claim 15, wherein the processor includes data related to an acoustic velocity of the acoustic waves in a drilling fluid.

* * * * *